July 1, 1930.  M. G. IVANDICK  1,769,517
CIRCUIT CLOSURE
Filed Nov. 10, 1927  3 Sheets-Sheet 1
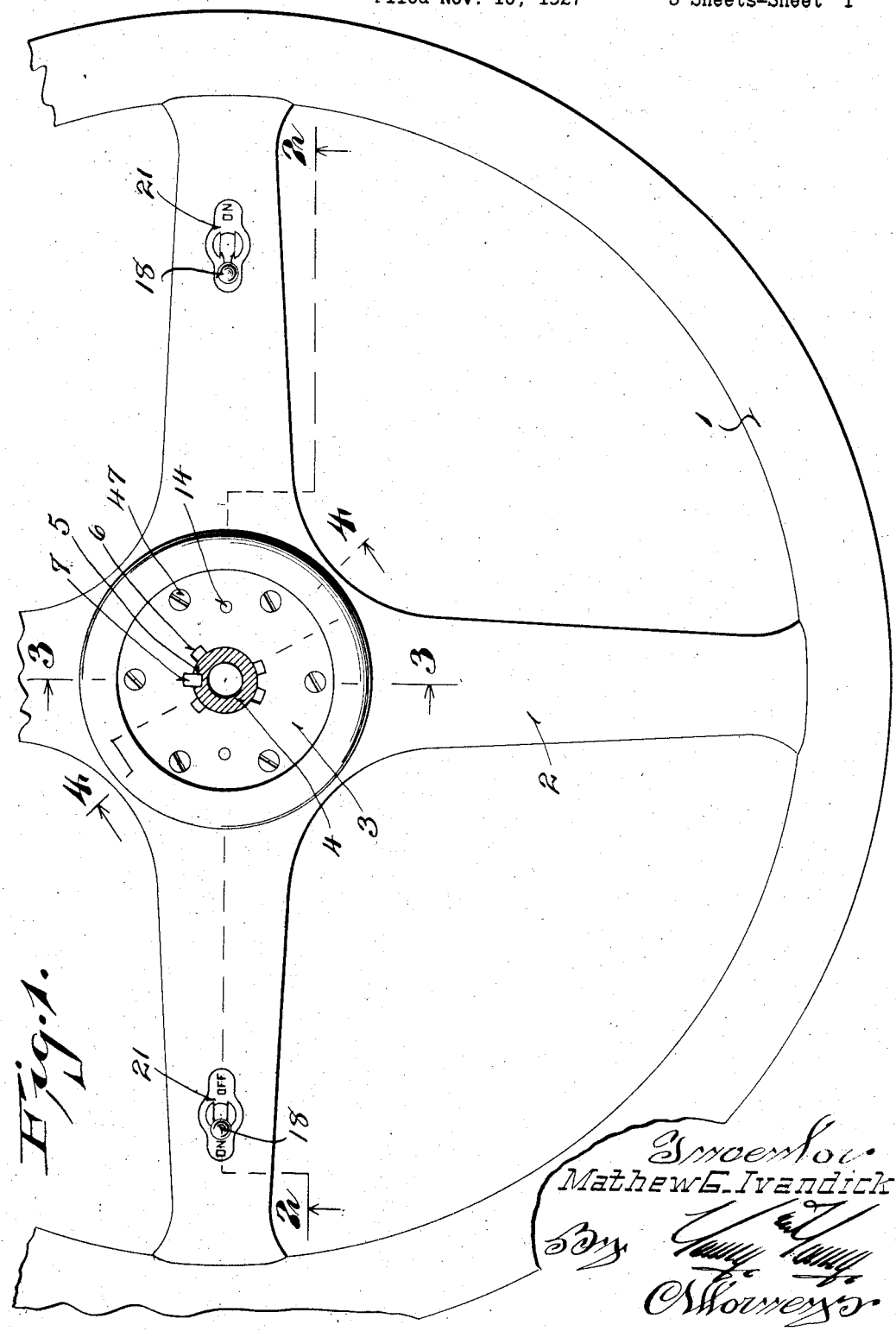

July 1, 1930.  M. G. IVANDICK  1,769,517
CIRCUIT CLOSURE
Filed Nov. 10, 1927   3 Sheets-Sheet 2
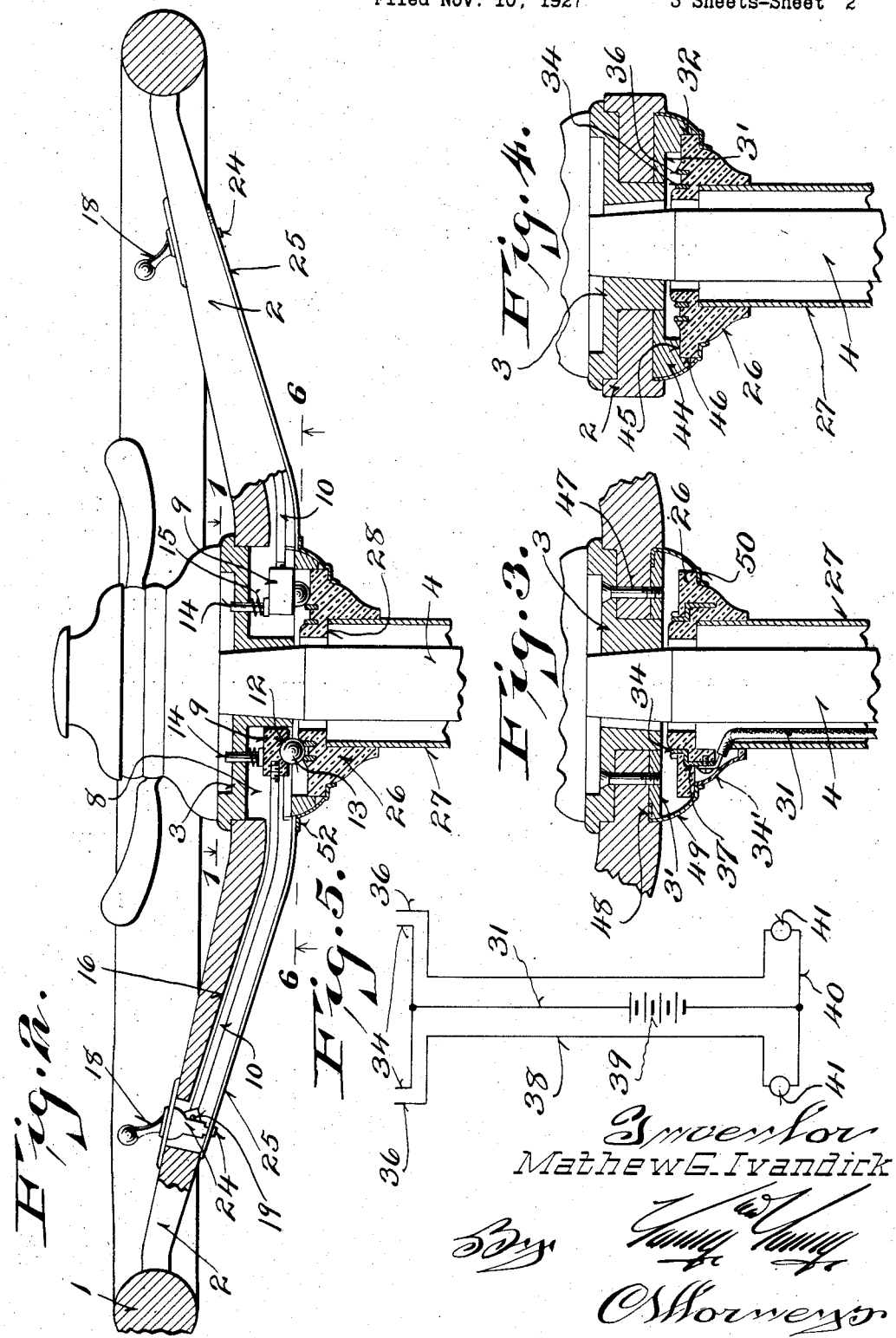

July 1, 1930.  M. G. IVANDICK  1,769,517
CIRCUIT CLOSURE
Filed Nov. 10, 1927   3 Sheets-Sheet 3
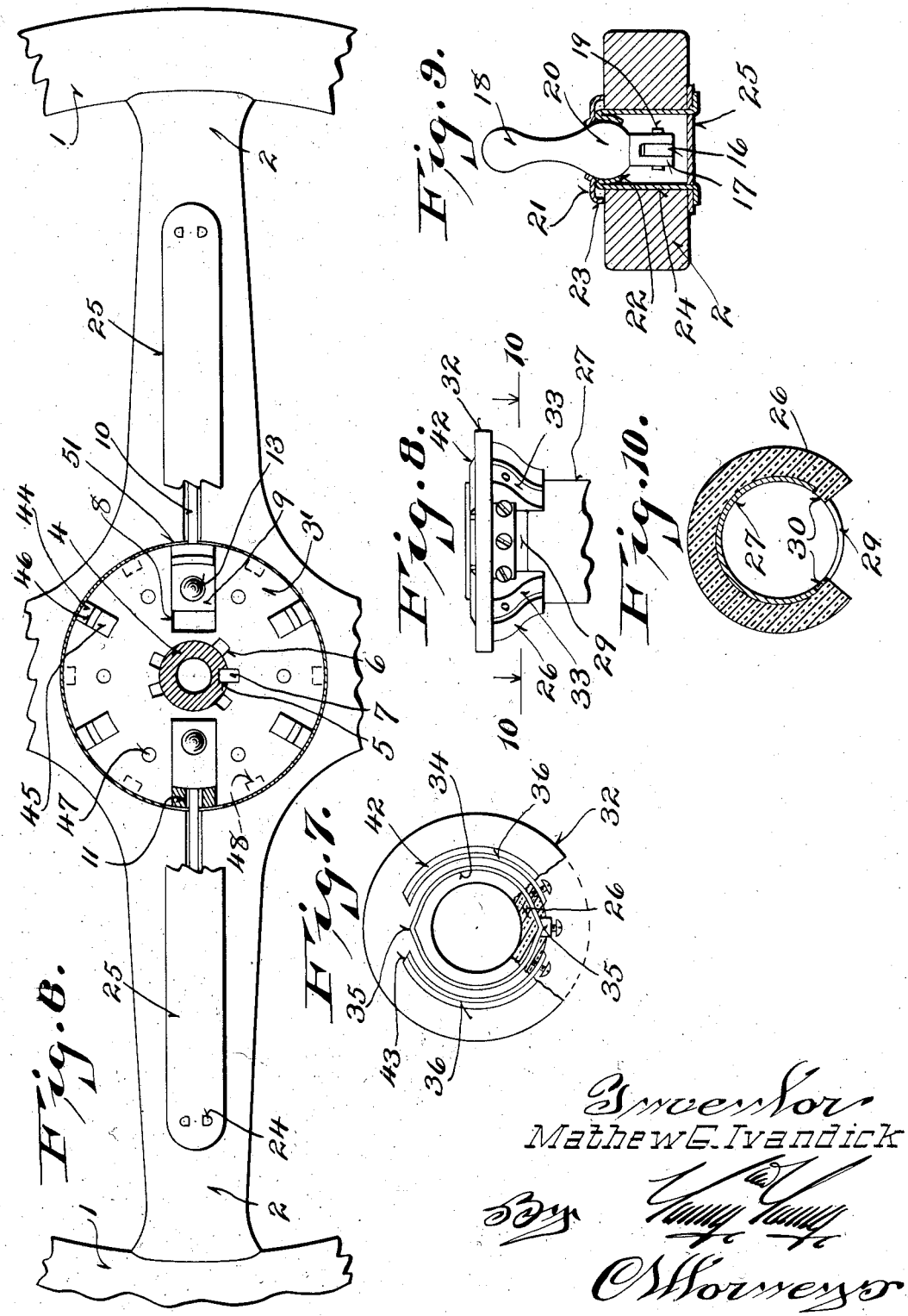
Inventor
Mathew G. Ivandick Patented July 1, 1930

1,769,517

UNITED STATES PATENT OFFICE

MATHEW G. IVANDICK, OF CHICAGO, ILLINOIS, ASSIGNOR TO FRANKLIN HARDINGE, OF CHICAGO, ILLINOIS

CIRCUIT CLOSURE

Application filed November 10, 1927. Serial No. 232,367.

This invention relates to signalling devices for automobiles and is particularly directed to a turning signal.

Objects of this invention are to provide a novel form of signal device adapted to be mounted upon the steering wheel of an automobile and to control the turning signal lights, so that the operator may apprise a following driver of his intention to turn, and a primary object of this invention is to provide a signalling device which is so constructed that the left hand of the operator is used to operate the left hand signal control lever and the right hand of the operator is used to control the right hand signal control lever without requiring the removal of either hand from the steering wheel, and to provide means for resetting the apparatus automatically upon the turning of the wheel in either direction.

Attempts have been previously made to provide a signal device controlled from the steering wheel, but these attempts have not proven wholly satisfactory as the device required the use of elaborate mechanism, such as push buttons, cam levers, tripping latches, and other complicated and unsightly devices of this general nature.

Further objects of this invention are to avoid the complicated mechanism heretofore employed and the unsightly constructions, and instead, to provide a device which has the appearance of a normal or standard steering wheel except for the provision of two tiny levers located adjacent the left and right hand sides of the steering wheel when in normal position, and in which the mechanism is so constructed that a very few number of parts are employed, and these parts are themselves extremely simple and rugged and are completely housed and hidden in a cap-like portion carried by the upper end of the steering column and conforming in contour to the standard equipment of the steering column, so that the presence of the signalling mechanism is not disclosed to a careful observer.

Further objects are to provide a device in which annular tracks are used for not only guiding revolubly mounted contacting members, but also for throwing the contacting members clear of the tracks upon turning of the hand wheel, so that the levers, latches, and other mechanism, for accomplishing this result, are wholly avoided, and instead very few parts are needed with the majority of these parts stationary.

Further objects are to provide a device in which there are no moving wires likely to be broken or have their coverings abraded. Instead, the apparatus is so constructed that the space between the steering post or shaft and the surrounding steering column or shell is utilized and the wires are passed through this space and are so associated with other portions of the device that they are not moved when the steering wheel is turned.

It frequently happens in applying devices of this nature to automobiles, that the switch actuating members are not accurately positioned at diametrically opposite points along a line at right angles to the axis of the car when the wheel is in neutral position. However, in practising this invention provision is made for the accurate positioning of the signal actuating levers at diametrically opposite points and transversely of the car when the wheel is in normal position, although the keyway cut in the steering post may be at an unusual location.

An embodiment of the invention is shown in the accompanying drawings in which:

Figure 1 is a plan view of a steering wheel with the device applied thereto, such view corresponding to a section on the line 1—1 of Figure 2;

Figure 2 is a sectional view on the line 2—2 of Figure 1;

Figure 3 is a sectional view on the line 3—3 of Figure 1;

Figure 4 is a sectional view on the line 4—4 of Figure 1;

Figure 5 is a diagrammatic view of the wiring;

Figure 6 is a sectional view on the line 6—6 of Figure 2;

Figure 7 is a plan view of the insulating cap removed from the other portions of the steering mechanism, such view being partly in section;

Figure 8 is an elevation of the structure shown in Figure 7 showing, however, the cap positioned upon the steering column;

Figure 9 is an enlarged transverse sectional view through one of the control levers;

Figure 10 is a sectional view on the line 10—10 of Figure 8.

Referring to the drawings, it will be seen that a steering wheel has been illustrated as provided with the rim 1, spokes 2, and a metallic hub 3. The hub is provided with a tapered central bore which receives the tapered upper portion of the steering shaft or post 4. This steering post 4 is provided with a keyway 5, and it is to be noted that the hub 3 is provided with a plurality of spaced keyways 6, anyone of which may cooperate with the keyway 5 to receive the key 7. Thus, when the device is applied to cars already on the market, it is a simple matter to align the appropriate keyway 6 in the hub of the wheel with the keyway of the steering post to thus secure the proper positioning of the control levers or signal levers on diametrically opposite sides of the steering wheel and in a line transverse to the axis of the car.

The hub 3 is further provided with a pair of rectangular cutouts or guideways 8 within which insulating blocks 9 are slidably mounted. These blocks 9 are provided with rods 10 which extend outwardly through apertures 11 formed in the hub, as shown most clearly in Figure 6. The blocks 9 are provided with spherical recesses 12 which receive metal balls 13 for a purpose hereinatfer to appear. Further, as will be noted from Figure 2, pressure pins 14 are slidably carried by the hub and are urged downwardly against the blocks 9 by means of springs 15. The recess or guideways 8, as may be seen from Figure 2, are positioned adjacent the laterally extending spokes of the wheel and these spokes are provided with channels or grooves 16 within which the rods are positioned. Preferably, the rods are threaded at their inner ends and screwed into the blocks 9 to secure a firm and reliable attachment thereto, although obviously, other means of attaching the rods may be employed. It is also preferable to form the pins 14 with enlarged bearing heads, as shown in Figure 2, so as not to wear the upper surface of the blocks 9 when they are slid radially inwardly and outwardly as hereinafter explained. The outer ends of the rods 16 are slightly flattened and are received between the spaced lugs 17 (see Figure 9) of the control levers or signal levers 18. These signal levers are provided with pins 19 which pass through the lugs 17 and the rods 16.

Further, it is to be noted from Figures 1, 2, 6, and 9 that the signal levers 18 are provided with ball-shaped enlargements 20 intermediate their ends, such enlargements being approximately spherical for a portion of their extent. These enlargements are held between the spherical recessed portions of an upper clip or plate 21 and a lower member 22. The upper member is provided with downwardly extending flanges 23 to increase its strength and also to give a finished appearance. The member 22 is provided with downwardly extending arms 24 whose lower ends pass through slots in the outer ends of closure plates 25. These closure plates 25, or strips, extend over the slots 16 in the steering wheel spokes, as may be seen from Figures 2, 6, and 9, and the ends of the downwardly extending lugs or arms 24 are bent outwardly, as shown in Figures 6 and 9, to retain the closure strips or plates in place at their outer ends. These strips extend inwardly and are retained at their inner ends in a manner hereinafter to appear. The members 21 and 22 of the retaining clips for the signal levers may be clamped together, if desired, or may be soldered or otherwise joined.

An annular insulating cap 26 is positioned upon the upper end of the steering column 27, as shown most clearly in Figure 2. This insulating member is preferably of molded material, such for instance, as bakelite, and is provided with a shouldered portion 28 which rests upon the upper end of the steering column 27. Further, it is to be noted from Figure 10, that the steering column is provided with a cutout portion 29 within which inwardly projecting lugs 30 extend, such lugs being integral with the insulating cap 26. Thus, the cap is held firmly in place and prevented from relative rotation with reference to the steering column. In addition to this, it is to be noted from Figure 8, that the cap has its downwardly extending flange cut away adjacent the opening 29 to provide a space for the passage of the wires 31, as shown in Figure 3. In addition to the construction outlined above, the cap is provided with an annular flange 32 (see Figure 8) which extends completely around the body portion of the cap. The cap adjacent the cut-away portion is provided with a pair of slightly inset faces 33 within which the ends of a closure plate 34' may be seated, such plate being held in place as hereinafter described.

Referring to Figures 2, 3, 4, 7, and 8, it will be noted that the cap 26 is provided with embedded metallic conducting rails which form a pair of tracks on opposite sides thereof. The innermost rail 34 is preferably continuous and is slightly bowed out or cammed at diametrically opposite points, as indicated at 35 in Figure 7. The outer rails 36 stop short of forming a complete semi-circle, as is apparent from reference to Figure 7. Each of the rails is provided with contact lugs, such as indicated at 37 in Figure 3, the lug 37 being integrally joined to the innermost rail 34. The other lugs are of identically similar construction and have not been illustrated.

Thus, the several wires may be readily joined to their respective rails. Diagrammatically, the wiring is illustrated in Figure 5, and it will be seen that the rails 34 are connected to the wire 31 and that the rails 36 are connected to wires 38. The wire 31 extends to one side of the battery 39, the other side of the battery being connected to a conductor 40 which extends to one side of each of a pair of lamps 41. The other side of the lamps 41 is connected to the appropriate wire 38, as shown in Figure 5. Thus, when the rails are bridged, for example, one of the outer rails 36 and the center rail 34, the appropriate lamp 41 is illuminated, and the proper signal given. This bridging of the rails is secured by the motion of the signal levers 18 which is imparted to the blocks 9 through the medium of the rods 10. These blocks 9 slide the balls 13 into bridging position with reference to the rails, as shown, for instance, on the left hand side of Figure 2.

The ends of the outer rails 36 are bevelled and, in addition to this, the raised slanting ridge 42 (see Figures 7 and 8) of the insulating cap 26 is also bevelled. The bevelled end surfaces are indicated by the reference character 43 in Figure 7, and their purpose will immediately appear.

Consider, for example, the position of the parts shown in Figure 2, which indicates a left hand turn, as the left hand signal lever 18 has been thrown outwardly by the thumb of the left hand of the driver. This gives the signal for a left hand turn by lighting the left hand signal lamp 41. When the wheel is turned, the ball which bridges the left hand tracks travels around such tracks until it encounters the corresponding cam portion 35 of the inner rail. This cam portion throws the ball radially outwardly. Upon a reverse rotation of the wheel to its normal position, the ball encounters one of the bevelled ends 43, previously described, and is thus moved farther radially outwardly back to its initial position with reference to the rails, as shown in Figure 2. The provision of ribs 42 hold the balls out of contact with the outermost rail when in normal position. In order to guard against inadvertent contact with the rails by the metal hub 3, such hub is provided with a plurality of downwardly extending fingers or lugs 44 and such lugs are provided with shouldered faces 45 positioned immediately above the cap 26. In addition to this, the lugs are provided with outer fingers or extensions 46 (see Figure 6) which as may be seen from Figure 4, are positioned on the outer side of the flange 32 of the insulating cap 26. Thus, inadvertent short circuiting of the rails either by relative motion of the parts due to defective construction of the steering mechanism or during assembly is wholly prevented by this construction. It is preferable also to form the hub 3 of two portions, for example, as shown in Figure 3. The lower portion of the hub consists of a plate 3' which is held in place by means of screws 47. It is also preferable to countersink the heads of the screws in the upper face of the hub, as shown in Figure 3, and to have them stop short or flush with the lower face of the bottom plate 3' of such hub. Between the plate 3' of the hub and the body of the wheel, the inwardly turned lugs 48 of an annular metal cap 49 are positioned and preferably the upper end of the cap 49 is inset with reference to the bottom face of the wheel body. This construction is most clearly shown in Figures 3, 4, and 6. It is to be noted from these figures particularly that the metal cap or annular shell is also provided with an inturned lower flange 50 which fits below the flange 32 of the insulating cap 26, and thus closes the space between the cap and the body of the wheel and forms a continuation of the general contour of the cap. The presence, therefore, of the mechanism is not suspected, as the wheel has the appearance of a standard wheel except for the tiny signal levers 18, and thus the ornamental appearance of the entire wheel as a unit is not marred.

It is to be noted particularly from Figure 3, that the space between the steering column or tube 27 and the steering post or shaft 4 is utilized as the wires 31 are passed through this annular space. Thus, it is not necessary to pass the wires through a central aperture formed in the steering post or shaft 4.

The manner of holding the outer end of the plates or strips 25 has been previously described. Their inner ends are positioned between the shell 49 and the body of the wheel, as shown in Figure 2. It is also preferable to provide the shell 49 with cutouts, as indicated at 51 in Figure 6, for the reception of the plates 25.

It may be found desirable to form the shell 49 with an upper annular flange 52 which strengthens its upper edge and may be positioned below the body of the wheel, as shown in Figure 2.

In using the device, all that is necessary is for the driver to manipulate the appropriate signal lever 18 by his hand on the side towards which he wishes to turn. During the turning of the wheel, the ball rides into contact with the cam portion 35 of the inner track and thereafter with the cammed or bevelled face 43 and is, consequently, restored to its initial position, the turning signal, however, having been given just prior to the turning and also during a major portion of the actual turning of the car.

It will be seen also that no thought is required on the part of the driver for he uses his right hand for a right hand turn and his left hand for the left hand turn, in the most natural manner. The parts are automatically restored to their initial or inoperative position by the mechanism described above. In addition to this, the insulating blocks 9 can not become inadvertently displaced as the pressure pins 14 bear downwardly against them and thus offer a slight frictional resistance, thereby retaining them in place. Rattling also is prevented by these pressure pins.

It is to be noted also that the bevelled annular portions 42 of the cap 26 provide a smooth upwardly slanting surface over which the balls may readily slide when they are moved radially inwardly during the manipulation of the parts.

Although the invention has been described in considerable detail, such description is intended as illustrative rather than limiting as the invention may be variously embodied and as the scope of such invention is to be determined as claimed.

I claim:

1. In an automobile, the combination of a steering wheel, a steering column, an insulating cap carried by the upper portion of said steering column and located beneath said steering wheel, and metal rails forming annular tracks, said rails being embedded in said insulating cap, a pair of metallic balls carried by said steering wheel, a pair of manually operable levers pivoted to said steering wheel for moving said balls onto said tracks, the inner rail having cam portions for dislodging said balls from said tracks when said steering wheel is rotated, and the outer of said rails having beveled portions for aiding in the dislodging of said balls.

2. In an automobile, the combination of a steering wheel, a steering column, an insulating cap carried by the upper portion of said steering column and located beneath said steering wheel, and metal rails forming annular tracks, said rails being embedded in said insulating cap, a pair of metallic balls carried by said steering wheel, a pair of manually operable levers pivoted to said steering wheel for moving said balls onto said tracks, the inner rail having cam portions for dislodging said balls from said tracks when said steering wheel is rotated, and the outer of said rails having beveled portions for aiding in the dislodging of said balls, said insulating cap having raised portions located on the outer side of said outer rail for holding said balls normally out of contact with said outer rail.

3. In an automobile, the combination of a steering wheel, a steering column, an insulating cap carried by said column, metallic rails embedded in said cap and forming annular tracks, insulating blocks set within recesses in said wheel and radially slidable therein, said blocks having recesses therein, metallic balls seated within said recesses, rods connected to said blocks, manually operable levers pivoted to said wheel for operating said rods to slide said blocks radially of said wheel for moving said balls onto and off said tracks, and springs urging said blocks towards said cap.

4. The combination of an automobile steering wheel, a stationary insulating member located below said wheel and carrying a pair of electrically conducting tracks, a revolubly mounted electrically conducting member normally positioned to the side of said tracks, manually operable means carried by said wheel for moving said revolubly mounted member onto said tracks, one of said tracks having a cam shaped and for derailing said revoluble member, whereby when said wheel is turned, said revoluble member is automatically repositioned at the side of said tracks.

5. The combination of an automobile steering wheel, a stationary insulating member located below said wheel and carrying a pair of electrically conducting tracks, a metallic ball normally located at one side of said tracks, a block having a recess for partially receiving said ball, a spring pressed member frictionally bearing against said block for holding said block in contact with said ball, and manually operable means for moving said block to position said ball upon said tracks.

In testimony that I claim the foregoing I have hereunto set my hand at Milwaukee, in the county of Milwaukee and State of Wisconsin.

MATHEW G. IVANDICK.